Oct. 30, 1951     G. O. KOPONEN     2,573,577
CAKE LIFTER AND PRESERVER
Filed Aug. 6, 1947
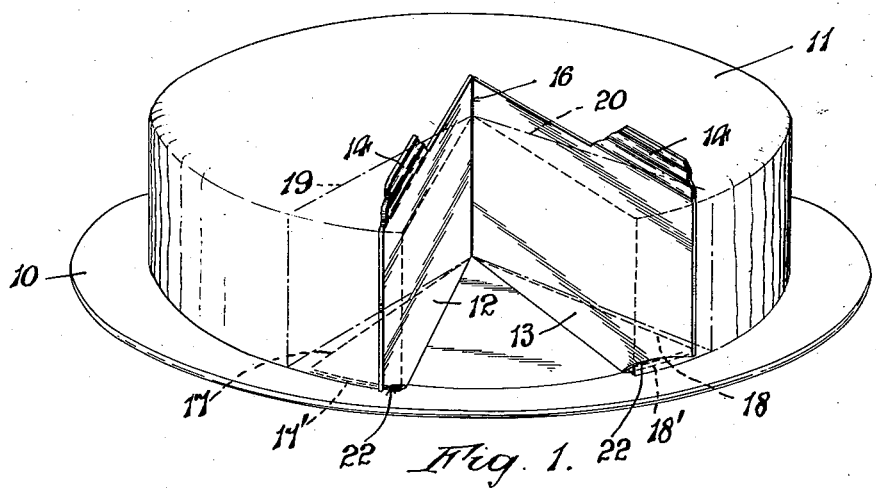
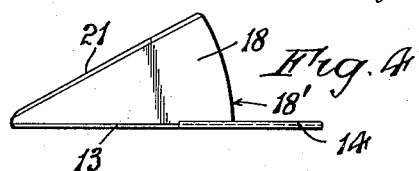
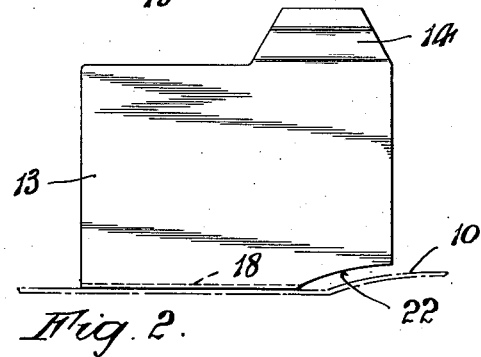
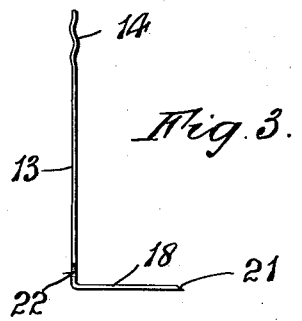
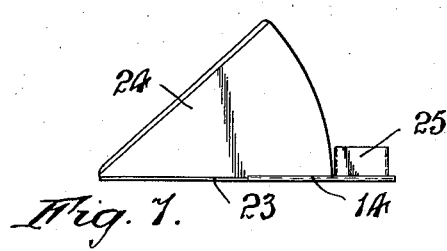
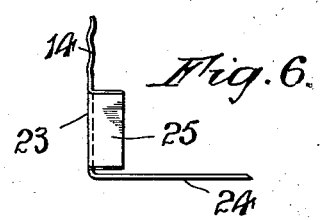
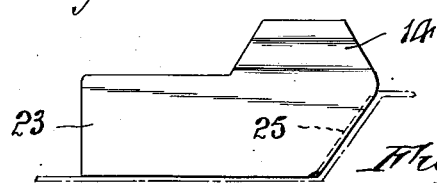
INVENTOR.
George O. Koponen.
BY
Stanley Lightfoot
ATTORNEY Patented Oct. 30, 1951

2,573,577

UNITED STATES PATENT OFFICE 2,573,577

CAKE LIFTER AND PRESERVER

George O. Koponen, Detroit, Mich.

Application August 6, 1947, Serial No. 766,727

2 Claims. (Cl. 294—1)

This invention relates to means for the protection of the cut surfaces of cakes, pies, and other similar food products, especially of the type which is usually cut in the form of wedges, and has for its object to provide for very simple form of device which may be positioned to cover the cut surface of the cake and so protect it from air and foreign matter; and, still further, it is an object of the invention to provide in the said device means for facilitating the removal of adjacent slices or wedges of the cake at such time as may be desirable.

More particularly, the invention contemplates the provision of vertical plate-like structures each adapted to be placed in contact with a cut end of a cake or similar article, each plate being provided with a horizontal foot member which is adapted to be slipped underneath the adjacent section of the cake in order that the said foot member may be utilized for the purpose of lifting such section of the cake from the article on which the cake rests.

I am aware that heretofore it has been suggested to use a pair of hinged plates which may be positioned in the wedge cut of a cake and moved to engage the opposed cut surfaces thereof, but such a device is in no way adapted to facilitate the lifting of further wedges of cake from their support. Furthermore, the two plates are dependent upon each other for their support in a vertical position so that, when the cake becomes cut to an extent whereby the exposed surfaces extend directly across the cake (as when half of the cake has been removed), the two plates would then be in the same plane and consequently devoid of any support. Thus, they would naturally fall over and be of little use in accomplishing their object under such conditions. Applicant's device is characterized by the fact that the two plates are entirely separate and independent of one another and are self-supporting in their positions of placement, the weight of the cake assisting in the supporting of the plates in such position.

In the case of a pie having a filling which normally tends to run, upon being exposed after the pie is cut, my device is especially of advantage in maintaining the filling within the pie in addition to protecting it from the effects of air and the elements.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 1 is a perspective view illustrating an embodiment of the said invention as utilized in relation to a cut cake;

Figure 2 is an elevation of one of the plate members of the device;

Figure 3 is an end elevation of the said member;

Figure 4 is a plan of the member;

Figure 5 is a similar view to Figure 2 of a somewhat modified form of the member such as is suitable for use in connection with preservation of cut pies;

Figure 6 is an end elevation of the said modified member; and

Figure 7 is a plan view of the same.

Similar characters of reference indicate similar parts in the several figures of the drawing.

10 illustrates a cake-plate carrying a circular cake 11 which is shown as having a wedge-shaped piece cut therefrom in the well known manner. Such cutting of the cake, of course, exposes two angularly disposed faces to the atmosphere which are particularly sensitive to the drying effects of the atmosphere; and in the case of a cake having a characteristic of crumbling, such crumbling is liable to take place throughout the passage of time to the detriment of the general appearance of the cut cake.

Furthermore, it is desirable to protect the cut surface from flies and dust, for instance, should the cake be kept in the open for any length of time.

As a means of protecting the cut surfaces of the cake, I provide a pair of plate-like members 12 and 13, each being of sufficient area to completely cover the cut surface to which it is applied and to extend beyond the margins thereof. I also prefer to provide a tab or handle 14 on each of the said plate members so that they may be easily applied to and removed from the cake without the fingers coming in contact with the cake itself.

It will be noted that when the two plate members 12 and 13 are inserted in the wedge-shaped gap, resulting from the removal of one or more pieces of cake in the usual manner, the inner end of the said plate-like members 12 and 13 meet in the center of the cake at 16, but it is not necessary that they be connected in any way where they so meet as the abutment of the opposed edges is quite effective in sealing the connection at that point as efficiently as is required.

Extending at right angles from the lower edge of the plate member 12 (or 13) is a foot member 17 (or 18) of segmental form inclined with its apex at the inner end of the plate member, as will be readily understood from an examination of Figures 1 and 4.

It is preferred that the outer margin 17' (or 18') of this foot member terminate short of the outer margin of its plate member 12 (or 13) so that it may, in use, snugly rest on the inner body portion of the cake dish 10 and extend beneath the bottom of the cake from a point somewhat inwardly of the perimeter thereof as shown in Figure 1. Thus, it will be clear of the flange or rim of the cake plate and will also permit the outer edge of the cake to remain resting on the bottom of the cake plate after the foot of the plate member has been inserted therebeneath.

It is commonly characteristic of a baked cake that the underside is somewhat concave to a slight extent and this further facilitates the insertion of the foot of the plate member therebeneath.

It will be quite obvious that this foot 17 (or 18) of the plate member serves two important and useful purposes. In the first place, when inserted beneath the cake adjacent a cut-out portion as shown, it effectively supports the plate member vertically in protective relation to the cut face of the cake and prevents the plate from falling outwardly and away therefrom; and, secondly, should the cake be further cut, as indicated by broken lines 19 and 20, these newly cut wedges may be readily and cleanly removed by simply lifting by one or other of the said plate-like members 12 or 13 so that the adjacent wedge of cake will be cleanly separated from the body of the cake and can be carried on the device to such point of disposal as is desired. To facilitate the insertion of the said foot pieces beneath the cake, they may be beveled at their free straight edge as at 21.

22 indicates the outer and lower margin of the said plate-like member as being cut away to provide for clearance above the rim of the cake plate or to prevent this margin of the device, which extends outwardly of the cake, from coming into contact with any surface object which might interfere with its proper positioning.

Referring to Figures 5, 6 and 7, a somewhat modified form of plate member 23 is shown in that this member is of less height than that which is required for cake and is intended for use with baked pies, more particularly, 14 being the handle and 24 being the segmental shaped foot all operating in the same manner as heretofore described in connection with the member 13.

This modified form shown in Figures 5, 6 and 7 is provided in addition with an angularly disposed tab or extension 25 adapted to extend under the conical side of the pie adjacent the cut and afford a support therefor at that point. This member 25 also serves, in conjunction with the member 23, to prevent the escape of fruit and juices from the cut pie to an undesirable extent, and still further, facilitates in supporting the pie when it is lifted by the foot member 24 from the pie plate.

It should be clear that the complete device consists of two separate plate-like members each having a foot portion bent at right angles thereto, the said foot portions, in the case of the two members, being either right or left hand according to the applied position it is to occupy in use. It will also be noted that the foot portions provide complete support for the plate members in position as well as serving as lifters for the removal of cut sections from the cake or other article.

This invention may be developed within the scope of the following claims without departing from the essential features of the said invention, and it is desired that the specification and drawing be read as being merely illustrative of a practical embodiment of the same and not in a strictly limiting sense.

What I claim is:

1. A cake lifter and preserver comprising a pair of vertical plates of sheet material of the same shape and size and each of sufficient area to cover one of the surfaces exposed in cutting a V-shaped gap in a cake or the like, each of said plates having a segmental foot extending at right angles from said bottom edge, said feet extending from said bottom edges to provide left and right structures, and integral lifting tabs each projecting from and in the plane of a respective plate, said plates being of generally rectangular form and provided with vertical edges, each plate having an inner vertical edge at the apex of the segmental foot and having an outer edge spaced from and terminating at its lower end above the plane of said foot, each plate having a notch extending from the lower end of its outer edge to the junction between said plate and said foot.

2. A cake lifter and preserver comprising a pair of vertical plates of sheet material of the same shape and size and each of a sufficient area to cover one of the surfaces exposed in cutting a V-shaped gap in a cake or the like, each of said plates having a segmental foot extending at right angles from said bottom edge, the foot of one plate extending from said bottom edge thereof in an opposite direction to the foot of the other plate to provide left and right structures, and lifting tabs each projecting from a respective plate, said plates being of generally rectangular form and provided with vertical inner and outer edges, the lower end of said outer plate edge terminating above the plane of the foot and each plate having a notch formed therein extending from the lower end of the outer edge thereof to the rear point of junction between said plate and said foot.

GEORGE O. KOPONEN.

REFERENCES CITED

The following references are of record in the file of this patent:

UNITED STATES PATENTS

| Number | Name | Date |
| --- | --- | --- |
| 400,537 | Barry | Apr. 2, 1889 |
| 1,612,367 | Fulton | Dec. 28, 1926 |